United States Patent [19]

Urata et al.

[11] Patent Number: 4,556,907
[45] Date of Patent: Dec. 3, 1985

[54] VIDEO CAMERA OPERATING DEVICE

[75] Inventors: Shinji Urata; Shigehiko Aoyagi; Kazuhiro Yamazaki, all of Tokyo, Japan

[73] Assignee: Asahi Kogaku Kogyo Kabushiki Kaisha, Tokyo, Japan

[21] Appl. No.: 601,534

[22] Filed: Apr. 18, 1984

[30] Foreign Application Priority Data

Apr. 30, 1983 [JP] Japan .................... 58-65791[U]

[51] Int. Cl.$^4$ .................. H04N 5/30; H01J 29/89
[52] U.S. Cl. .................... 358/210; 352/140
[58] Field of Search ............... 358/227, 210, 229, 225; 354/195.1, 195.13; 352/140

[56] References Cited

U.S. PATENT DOCUMENTS

| 2,782,253 | 2/1957 | Allanson | 358/210 |
| 3,883,883 | 5/1975 | Sano | 352/140 |
| 4,225,886 | 9/1980 | Smith | 358/210 |
| 4,244,006 | 1/1981 | Kitahara | 358/210 |
| 4,314,278 | 2/1982 | Smith | 358/210 |
| 4,321,625 | 3/1982 | Smith | 358/210 |
| 4,374,613 | 2/1983 | Stempeck | 354/195.13 |

FOREIGN PATENT DOCUMENTS

| 1066232 | 10/1959 | Fed. Rep. of Germany | 358/210 |
| 2113942 | 10/1972 | Fed. Rep. of Germany | 352/140 |

Primary Examiner—Thomas W. Brown
Assistant Examiner—L. C. Schroeder
Attorney, Agent, or Firm—Sughrue, Mion, Zinn, Macpeak, and Seas

[57] ABSTRACT

A video camera operating device which permits the photographing lens of the camera to be controlled either in an automatic mode or a manual mode from a remote operating device. Both the remote operating device and a close operating device on the video camera body include an automatic focusing/manual focusing changeover switch. When the remote operating device is connected to the video camera via a cable, the automatic focusing/manual focusing changeover switch of the remote operating device takes precedence over that of the close operating device. The remote operating device also includes controls for selecting short or long distance movement of the lens and for controlling the speed at which the lens is moved.

6 Claims, 1 Drawing Figure

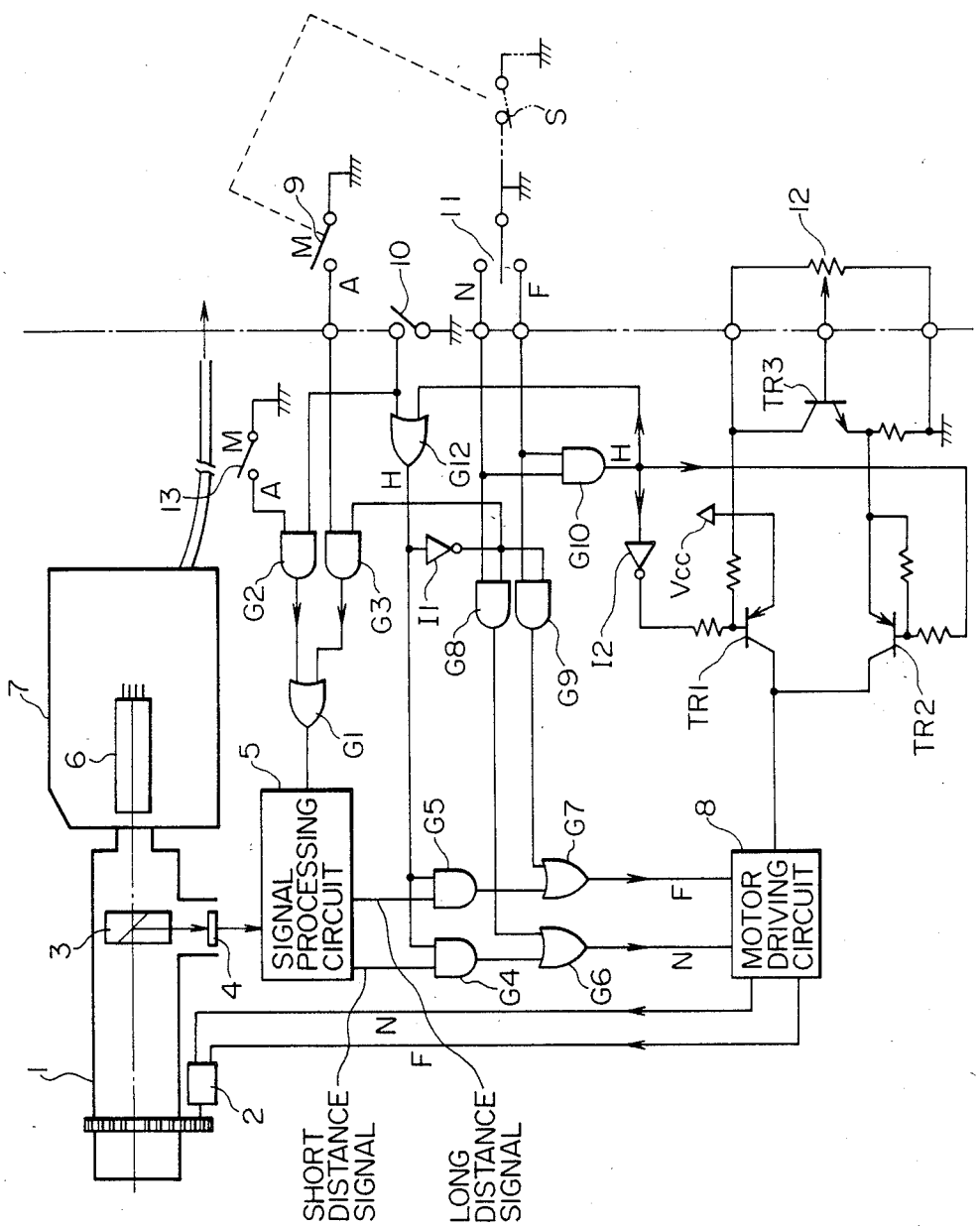

ered embodiment of a video camera operating device of the invention.

VIDEO CAMERA OPERATING DEVICE

BACKGROUND OF THE INVENTION

The present invention relates to a video camera operating device.

In general, an automatic focusing device for a video camera detects data relating to an object to be photographed and drives the focusing lens and/or other operating members according to the data thus detected so that the lens is correctly focused on the object, thus eliminating the troublesome focusing operation. Accordingly, a camera employing such a device is considerably convenient for an ordinary photographer.

However, the automatic focusing device is not infallible. The percentage of shots for which the device focuses the lens completely correctly on a desired object is only of the order of 70% to 80% because of various conditions of the object or various factors such as the luminescence of the object. In the remaining 20% to 30%, the device cannot completely correctly focus the lens on the object.

In the case where the device cannot completely focus the lens on the object, the automatic focusing mode can be switched over to the manual focusing mode. In such a case, the focusing ring of the photographing lens must be manually set to focus the lens on the object. Therefore, even if the device cannot completely correctly focus the lens on the object in the automatic focusing mode, it is still possible to obtain correct focusing. Manual focusing is not so inconvenient in an ordinary photographing operation in which no remote operation is involved. However, in the case of a remote operation where a remote operating device is connected to the camera via a cable, manual focusing is quite difficult.

Further, if the automatic focusing mode is used during remote operation, then it is impossible to forcibly defocus the lens, and accordingly a desired photographic effect may not be obtainable. This problem may be solved by switching the automatic focusing mode over to the manual focusing mode. However, to do so is troublesome and sometimes impossible.

SUMMARY OF THE INVENTION

In view of the foregoing, an object of the invention is to provide a video camera operating device including a close operating device and a remote operating device in which in remote operations the lens can be completely correctly focused on the object and can also be forcibly defocused.

The foregoing and other objects of the invention have been achieved by the provision of a video camera operating device including a close operating device and a remote operating device, which, according to the invention includes means for causing an operating mode selected by an automatic focusing/manual focusing changeover switch of the remote operating device to take precedence over an operating mode selected by an automatic focusing/manual focusing changeover switch of the close operating device, and driving means for remotely driving the video lens as desired when the automatic focusing/manual focusing switch of the remote operating device is operated at least for a manual focusing mode in a remote operation.

BRIEF DESCRIPTION OF THE DRAWINGS

The single FIGURE is a circuit diagram of a preferred embodiment of a video camera operating device of the invention.

DESCRIPTION OF THE PREFERRED EMBODIMENTS

The invention will be described with reference to a preferred embodiment shown in the single FIGURE in the accompanying drawing, which is a circuit diagram of the preferred embodiment. A specific feature of the embodiment is that the video lens can be remotely driven not only when the automatic focusing/manual focusing switch of the remote operating device is not only when the automatic focusing/manual focusing swith of the remote operating device is set to select the automatic focusing mode, but also when it is set to select the manual focusing mode.

The video lens 1 is driven by a focusing motor 2. A beam splitter 3 is provided in the video lens 1. An automatic focusing sensor 4 receives a light beam through the beam splitter 3. The output signal of the sensor 4 is processed by a signal processing circuit 5. An image pickup device 6 and related components are accommodated in a video camera 7.

A motor driving circuit 8 receives a short distance signal or a long distance signal from a logic circuit (described below) to drive the focusing motor 2. In the FIGURE, a close operating device is shown on the left-hand side of the one-dot chain line, and a remote operating device is shown on the right-hand side thereof. These devices are connected to each other through a connector. A detecting switch 10 is provided in the connector. The detecting switch 10 is turned on when the two halves of the connector are joined.

The remote operating device has a changeover switch 9 for selecting between the automatic focusing mode and the manual focusing mode, a remote power focus switch 11 for selecting the direction of movement of the video lens 1 in remote operation, and a variable resistor 12 for adjusting the speed of movement of the video lens in the manual focusing operation during the remote operation. When the changeover switch 9 is turned on, the automatic focusing mode is selected, and when it is turned off, the manual focusing mode is selected. The remote power focus switch 11 has a short distance (normal speed of movement) terminal N and a long distance (fast speed of movement) terminal F, and the armature of the switch 11 can be set between the two terminals N and F.

The output terminal of an OR gate G1 is connected to the signal processing and operating circuit 5 and input terminals thereof are connected respectively to the output terminals of AND gates G2 and G3. The OR gate G1 outputs a low level signal when the automatic focusing mode is selected and a high level signal when the manual focusing mode is selected. The AND gate G2 has one input terminal grounded through a manually operated switch 13. The other input terminal of the AND gate LG2 is grounded though the detecting switch 10. The switch 13 is used to select between the automatic focusing mode and the manual focusing mode. It is turned on to select the automatic focusing mode. The AND gate G3 has one input terminal grounded through the changeover switch 9 and the other input terminal connected to the output terminal of an inverter 11.

AND gates G4 and G5 receive the short distance signal and the long distance signal from the circuit 5. The short distance signal is used to focus the video lens 1 on an object at a short distance and the long distance signal is used to focus the video lens on an object at a long distance. The other input terminals of the AND gates G4 and G5 are connected through an OR gate G12 to one terminal of the detecting switch 10. The other input terminal of the OR gate G12 is connected to the output terminals of an AND gate G10. The output terminal of the OR gate 12 is connected through the inverter 11 to input terminals of AND gates G8 and G9, the other input terminals of which are connected to the terminals N and F of the remote power focus switch 11.

An OR gate G6 receives output signals from the AND gates G4 and G8, and an OR gate G7 receives output signals from the AND gates G5 and G9. The short distance signal and the long distance signal are supplied respectively through the OR gates G6 and G7 to the motor driving circuit 8.

An AND gate G10 has two input terminals connected respectively to the terminals N and F of the switch 11. The output terminal of the AND gate G10 is connected through an inverter 12 to the base of a PNP transistor TR1, and is further connected to the base of a PNP transistor TR2. The emitter of the transistor TR1 is connected directly to a power supply terminal at a voltage $V_{cc}$. The emitter of the transistor TR2 is connected through a transistor TR3 to the power supply terminal at $V_{cc}$. The transistor TR3 operates to control the amount of current applied to the transistor TR2 according to the setting of the variable resistor 12.

The operations of the video camera operating device thus constructed will now be described.

First, manual operation, which is carried out by using the close operating device provided on the camera side instead of the remote operating device, will be described.

For manual operation, as it is unnecessary to use the remote operating device, the connector indicated by the one-dot chain line in the FIGURE is disconnected. Therefore, the AND gates G2 and G3 are opened, the OR gate G12 outputs a high level signal, and the AND gate G10 outputs a high level signal. Since the OR gate G12 outputs a high level signal, the AND gates G4 and G5 are opened and the inverter I1 outputs a low level signal. Since the inverter I1 outputs a low level signal, the AND gates G8 and G9 are closed, as a result of which the OR gate G6 and G7 transmit only the signals of the AND gates G4 and G5, respectively.

It is assumed that, under this condition, the armature of the changeover switch 13 of the manual operating device is changed to the terminal A (automatic). In this case, the AND gate G2 outputs a low level signal. Since the AND gate G3 also outputs a low level signal, the OR gate G1 outputs a low level signal. As a result, the signal processing circuit 5 outputs the short or long distance signal required for the automatic focusing operation. In this case, since the AND gates G4 and G5 have been opened as described above, the motor driving circuit 8 receives the short distance signal or the long distance signal depending on the distance of the object. Because the output signal of the AND gate is at the high level as described above, the transistor TR2 is turned off. On the other hand, since the inverter I2 outputs a low level signal, the transistor TR1 is turned on. Accordingly, a relatively high voltage is applied to the motor 2 so that the latter is driven at high speed.

On the other hand, in the case when the armature of the changeover switch 13 is set to the terminal M (manual), the AND gate G2 outputs a high level signal. Therefore, the OR gate G1 outputs a high level signal, and the signal processing and operating circuit 5 outputs no signal necessary for the automatic operation. In this case, the photographer can operate the manual focusing ring to focus the lens on the object.

In the case of remote operation, the connector indicated by the one-dot chain line is connected and the detecting switch 10 is therefore turned on. Accordingly, the AND gate G2, being closed, outputs a low level signal.

It is assumed that, under this condition, the armature of the remote power focus switch 11 is positioned between the terminals N and F as shown in the FIGURE, and the armature of the changeover switch 9 is set to the terminal A (automatic). In this case, the AND gate G3 is also closed, and therefore the OR gate G1 outputs a low level signal. As a result, the signal processing and operating circuit 5 outputs the short distance signal or the long distance signal. On the other hand, as the armature of the switch 11 is positioned between the terminals N and F, the AND gate G10 outputs a high level signal and the OR gate G12 also outputs the high level signal. Therefore, the AND gates G4 and G5 are opened. However, since the inverter I1 then outputs a low level signal, the AND gates G8 and G9 are closed, and therefore the OR gates G6 and G7 transmit only the signals of the AND gates G4 and G5, respectively. Thus, an operation similar to the automatic focusing operation is carried out in the manual operation mode.

It is assumed that the armature of the focus switch 11 is not set to the short distance terminal N or the long distance terminal F. In this case, the AND gate G10 outputs a low level signal, the therefore the OR gate G12 outputs a low level signal. Hence, the AND gates G4 and G5 are closed. Accordingly, even if the armature of the changeover switch 9 is set to the terminal A (automatic), the signal from the circuit 5 will be disregarded. If the armature of the focus switch 11 has been set to the terminal N (or F), the AND gate G9 (or G8) outputs a high level signal. This signal is applied through the OR gate G7 (or G6) to the motor driving circuit 8. Since the AND gate G10 provides a low level signal, the transistor TR1 is rendered nonconductive while the transistor TR2 is rendered conductive. As a result, a low voltage of a magnitude determined by the setting of the variable resistor 12 is supplied to the motor driving circuit 8 so that the video lens 1 is moved at low speed. The speed of movement of the video lens 1 can be controlled freely by varying the resistance of the variable resistor 12.

Whenever the armature of the focus switch 11 is set to the terminal N or F, both of the AND gates G4 and G5 are closed. Accordingly, even if the switch 9 is set for the manual focusing mode, the video lens 1 is moved in the direction which is selected by the focus switch 11.

In the case where the armature of the switch 9 of the remote operating device has been set to the automatic focusing terminal A, manual focusing can be carried out without moving the armature of the switch 9 to the manual focusing terminal M. This is one advantage of the invention.

The video camera operating device of the invention may be modified so that manual focusing is carried out only when, after the armataure of the switch 9 has been set to the maual focusing terminal M, the armature of the focus switch 11 is moved to the terminal N or F. This modification can be achieved most readily by the following technique. A switch S is provided between the armature of the focus switch 11 are operated in such a manner that the switch S and the switch 9 are operated simultaneously, but when the switch 9 is turned off the switch S is turned on, and when the switch 9 is turned on the switch S is turned off, as indicated by the two-dot chain line and the broken line. Also, in the modification, the armature of the switch 11 must be disconnected from ground.

While the invention has been described with reference to preferred embodiments, the invention is not limited thereby or thereto. That is, the video camera operating device may allow a mode selected by the automatic focusing/manual focusing changeover switch of the remote operating device to take precedence over a mode selected by the automatic focusing/manual focusing changeover switch of the close operating device, and driving means for remotely driving the video lens as desired when the automatic focusing/manual focusing changeover switch of the remote operating device has been operated at least for the manual focusing mode in the remote operation.

As is apparent from the above description, the video camera operating device including a close operating device and a remote operating device according to the invention has an advantage that in the remote operation the lens can both be focused completely correctly on the object and can be forcibly defocused.

We claim:

1. A video camera operating device including a close operating device and a remote operating device, comprising:
   means for causing an operating mode selected by an automatic focusing/manual focusing changeover switch of said remote operating device to take precedence over an operating mode selected by an automatic focusing/manual focusing changeover switch of said close operating device; and
   driving means for remotely driving a video lens when said automatic focusing/manual focusing switch of said remote operating device is operated at least for a manual focusing mode in a remote operation.

2. The video camera operating device as claimed in claim 1, wherein a voltage for driving a focusing motor can be set to a desired value by said remote operating device.

3. A video camera operating device comprising: a close operating device and a remote operating device, said close operating device being positioned within a body of said video camera, and said remote operating device being coupled to said body of said video camera via a cable, each of said close operating device and said remote operating device having an automatic focusing/manual focusing changeover switch, and said close operating device comprising means for controlling a focusing position of a photographing lens of said camera in response to said automatic focusing/manual focusing changeover switches of said close operating device and said remote operating device with said automatic focusing/manual focusing changeover switch of said remote operating device having precedence over said automatic focusing/manual focusing changeover switch of said close operating device.

4. The video camera operating device as claimed in claim 3, further comprising connector means for connecting said cable to said close operating device, said connector means comprising switch means for detecting when said cable is connected, an output of said switch means being applied to said focusing position controlling means.

5. The video camera operating device as claimed in claim 4, wherein said remote operating device further comprises a remote power focus switch and first and second contacts to which said armature is selectively set for selecting between long-distance and short-distance movement of said photographing lens, said remote power focus switch being connected via said cable to said focusing position controlling means of said close operating device.

6. The video camera operating device of claim 5, wherein said remote operating device further comprises variable resistor means for selecting a speed of movement of said photographing lens during a focusing operation, said variable resistor means being coupled via said cable to said focusing position controlling means of said close operating device, and said close operating device comprising means for controlling a speed of movement of said photographing lens during a focusing operation in response to an output of said variable resistor means.

* * * * *